United States Patent
Kondou et al.

(10) Patent No.: US 10,189,536 B2
(45) Date of Patent: Jan. 29, 2019

(54) BICYCLE DISC BRAKE CALIPER

(71) Applicant: SHIMANO INC., Sakai (JP)

(72) Inventors: Akira Kondou, Sakai (JP); Takuma Sakai, Sakai (JP); Hideki Ikemoto, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/460,180

(22) Filed: Mar. 15, 2017

(65) Prior Publication Data

US 2018/0265166 A1   Sep. 20, 2018

(51) Int. Cl.
| | |
|---|---|
| *B62L 1/00* | (2006.01) |
| *F16D 65/00* | (2006.01) |
| *F16D 55/228* | (2006.01) |
| *F16D 65/18* | (2006.01) |
| *B62L 3/02* | (2006.01) |
| *F16D 121/04* | (2012.01) |
| *F16D 55/00* | (2006.01) |

(52) U.S. Cl.
CPC ............ *B62L 1/005* (2013.01); *B62L 3/023* (2013.01); *F16D 55/228* (2013.01); *F16D 65/0075* (2013.01); *F16D 65/183* (2013.01); *F16D 2055/002* (2013.01); *F16D 2121/04* (2013.01)

(58) Field of Classification Search
CPC ......... F16D 2055/0091; F16D 2055/16; F16D 55/228; F16D 2055/0016; B62K 19/38
See application file for complete search history.

(56) References Cited

U.S. PATENT DOCUMENTS

| | | | |
|---|---|---|---|
| 5,386,890 A * | 2/1995 | Itsuaki | F16D 65/097 188/72.4 |
| 6,761,251 B1 * | 7/2004 | Wen | B62L 3/023 188/26 |
| 9,227,691 B2 | 1/2016 | Noborio et al. | |
| 9,309,938 B2 | 4/2016 | Nakakura | |
| 9,347,505 B2 | 5/2016 | Noborio et al. | |
| 9,533,733 B2 | 1/2017 | Noborio et al. | |
| 2004/0231932 A1 * | 11/2004 | Regazzoni | B62K 19/38 188/73.31 |
| 2004/0251093 A1 * | 12/2004 | Simmons | B62L 3/08 188/72.4 |
| 2006/0124404 A1 * | 6/2006 | Morais | F16D 55/228 188/71.1 |
| 2007/0045056 A1 * | 3/2007 | Kawai | F16D 55/228 188/26 |

(Continued)

*Primary Examiner* — Bradley T King
(74) *Attorney, Agent, or Firm* — Mori & Ward, LLP

(57) ABSTRACT

A bicycle disc brake caliper comprises a caliper body. The caliper body includes a slot in which a brake pad is arranged. The caliper body includes a first body portion, a second body portion, a mounting surface, a first receiving hole, a cylinder bore, and a second cylinder bore. The second body portion is coupled to the first body portion so as to provide a slot therebetween. The mounting surface is configured to face a pipe portion of a bicycle body in a mounted state where the bicycle disc brake caliper is mounted to the bicycle body. The first receiving hole is provided on the mounting surface. The first receiving hole is configured to be threadedly engaged with a fastener to mount the bicycle disc brake caliper to the bicycle body. The first cylinder bore is provided on the first body portion. The second cylinder bore is provided on the first body portion.

26 Claims, 15 Drawing Sheets

(56) References Cited

U.S. PATENT DOCUMENTS

| | | | |
|---|---|---|---|
| 2007/0080032 A1* | 4/2007 | Sano | F16D 65/0006 |
| | | | 188/73.31 |
| 2013/0133991 A1* | 5/2013 | Thomas | F16D 55/22 |
| | | | 188/73.31 |
| 2013/0277158 A1* | 10/2013 | Previtali | F16D 55/228 |
| | | | 188/73.47 |
| 2015/0001012 A1* | 1/2015 | Noborio | B62L 1/005 |
| | | | 188/72.4 |
| 2015/0360744 A1 | 12/2015 | Noborio et al. | |
| 2016/0207587 A1* | 7/2016 | Schottler | B62L 1/005 |
| 2017/0009833 A1* | 1/2017 | Gallagher | F16D 55/228 |

* cited by examiner

BICYCLE DISC BRAKE CALIPER

BACKGROUND OF THE INVENTION

Field of the Invention

The present invention relates to a bicycle disc brake caliper.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a disc brake.

SUMMARY OF THE INVENTION

In accordance with a first aspect of the present invention, a bicycle disc brake caliper comprises a caliper body. The caliper body includes a first body portion, a second body portion, a mounting surface, a first receiving hole, a cylinder bore, and a second cylinder bore. The second body portion is coupled to the first body portion so as to provide a slot therebetween. The mounting surface is configured to face a pipe portion of a bicycle body in a mounted state where the bicycle disc brake caliper is mounted to the bicycle body. The first receiving hole is provided on the mounting surface. The first receiving hole is configured to be threadedly engaged with a fastener to mount the bicycle disc brake caliper to the bicycle body. The first cylinder bore is provided on the first body portion. The second cylinder bore is provided on the first body portion.

With the bicycle disc brake caliper according to the first aspect, it is possible to easily mount the bicycle disc brake caliper to the pipe portion of the bicycle body with the mounting surface. Furthermore, it is possible to apply a larger braking force to a disc brake rotor using the first cylinder bore and the second cylinder bore.

In accordance with a second aspect of the present invention, the bicycle disc brake caliper according to the first aspect is configured so that the first receiving hole includes a first threaded hole having a first center axis. The first cylinder bore has a first cylinder center axis non-parallel to the first center axis.

With the bicycle disc brake caliper according to the second aspect, this arrangement of the first center axis and the first cylinder center axis makes the caliper body compact.

In accordance with a third aspect of the present invention, the bicycle disc brake caliper according to the second aspect is configured so that the first cylinder center axis is perpendicular to the first center axis as viewed in a direction perpendicular to both the first center axis and the first cylinder center axis.

With the bicycle disc brake caliper according to the third aspect, this arrangement of the first center axis and the first cylinder center axis makes the caliper body more compact.

In accordance with a fourth aspect of the present invention, the bicycle disc brake caliper according to the second or third aspect is configured so that the mounting surface is provided on the first body portion. The first center axis extends through the first cylinder bore.

With the bicycle disc brake caliper according to the fourth aspect, this arrangement of the first center axis and the first cylinder bore makes the caliper body more compact.

In accordance with a fifth aspect of the present invention, the bicycle disc brake caliper according to the fourth aspect is configured so that the first cylinder center axis is offset from the first center axis.

With the bicycle disc brake caliper according to the fifth aspect, this arrangement of the first center axis and the first cylinder center axis makes the caliper body more compact.

In accordance with a sixth aspect of the present invention, the bicycle disc brake caliper according to any one of the first to fifth aspects is configured so that the caliper body further includes a second receiving hole provided on the mounting surface.

With the bicycle disc brake caliper according to the sixth aspect, it is possible to more firmly mount the bicycle disc brake caliper to the pipe portion of the bicycle body using the first receiving hole and the second receiving hole.

In accordance with a seventh aspect of the present invention, the bicycle disc brake caliper according to the sixth aspect is configured so that the second receiving hole includes a second threaded hole having a second center axis. The second cylinder bore has a second cylinder center axis non-parallel to the second center axis.

With the bicycle disc brake caliper according to the seventh aspect, this arrangement of the second center axis and the second cylinder center axis makes the caliper body compact.

In accordance with an eighth aspect of the present invention, the bicycle disc brake caliper according to the seventh aspect is configured so that the second cylinder center axis is perpendicular to the second center axis as viewed in a direction perpendicular to both the second center axis and the second cylinder center axis.

With the bicycle disc brake caliper according to the eighth aspect, this arrangement of the second center axis and the second cylinder center axis makes the caliper body more compact.

In accordance with a ninth aspect of the present invention, the bicycle disc brake caliper according to the seventh or eighth aspect is configured so that the mounting surface is provided on the first body portion. The second center axis extends through the second cylinder bore.

With the bicycle disc brake caliper according to the ninth aspect, this arrangement of the second center axis and the second cylinder bore makes the caliper body more compact.

In accordance with a tenth aspect of the present invention, the bicycle disc brake caliper according to the ninth aspect is configured so that the second cylinder center axis is offset from the second center axis.

With the bicycle disc brake caliper according to the tenth aspect, this arrangement of the second center axis and the second cylinder center axis makes the caliper body more compact.

In accordance with an eleventh aspect of the present invention, the bicycle disc brake caliper according to any one of the seventh to tenth aspects is configured so that the first receiving hole includes a first threaded hole having a first center axis. The second center axis is parallel to the first center axis.

With the bicycle disc brake caliper according to the eleventh aspect, this arrangement of the first center axis and the second center axis makes the caliper body more compact.

In accordance with a twelfth aspect of the present invention, the bicycle disc brake caliper according to the eleventh aspect is configured so that a distance between the first center axis and the second center axis is equal to or larger than 15 mm and is equal to or smaller than 55 mm.

With the bicycle disc brake caliper according to the twelfth aspect, this arrangement of the first center axis and the second center axis allow the caliper body to be firmly mounted to the pipe portion of the bicycle body with making the caliper body more compact.

In accordance with a thirteenth aspect of the present invention, the bicycle disc brake caliper according to the eleventh or twelfth aspect is configured so that no portion of the caliper body extends beyond the mounting surface in a direction toward the bicycle body along a line extending directly between the first threaded hole and the second threaded hole.

With the bicycle disc brake caliper according to the thirteenth aspect, it is possible to easily form the mounting surface and to give clear appearance to users.

In accordance with a fourteenth aspect of the present invention, the bicycle disc brake caliper according to any one of the first to thirteenth aspects is configured so that the first cylinder bore has a first cylinder center axis. The second cylinder bore has a second cylinder center axis parallel to the first cylinder center axis.

With the bicycle disc brake caliper according to the fourteenth aspect, it is possible to efficiently apply a braking force to a disc brake rotor using the first cylinder bore and the second cylinder bore.

In accordance with a fifteenth aspect of the present invention, the bicycle disc brake caliper according to any one of the first to fourteenth aspects is configured so that the first cylinder bore has a first maximum inner diameter. The second cylinder bore has a second maximum inner diameter. The first maximum inner diameter is different from the second maximum inner diameter.

With the bicycle disc brake caliper according to the fifteenth aspect, it is possible to appropriately apply a braking force to a disc brake rotor in accordance with a rotational direction of the disc brake rotor.

In accordance with a sixteenth aspect of the present invention, the bicycle disc brake caliper according to the fifteenth aspect is configured so that the first cylinder bore is provided on a downstream side of the second cylinder bore in a driving rotational direction in which a disc brake rotor is rotated relative to the bicycle disc brake caliper in a driving state where a bicycle is forwardly moved. The first maximum inner diameter is larger than the second maximum inner diameter.

With the bicycle disc brake caliper according to the sixteenth aspect, it is possible to more appropriately apply the braking force to the disc brake rotor in accordance with a driving rotational direction of the disc brake rotor.

In accordance with a seventeenth aspect of the present invention, the bicycle disc brake caliper according to the fifteenth aspect is configured so that the caliper body includes a hydraulic port. The first cylinder bore has a first maximum inner diameter. The first cylinder bore is closer to the hydraulic port than the second cylinder bore. The second cylinder bore has a second maximum inner diameter. The first maximum inner diameter is larger than the second maximum inner diameter.

With the bicycle disc brake caliper according to the seventeenth aspect, it is possible to appropriately apply a braking force to a disc brake rotor in accordance with a rotational direction of the disc brake rotor with utilizing an area closer to the pipe portion for a hydraulic hose connected to the hydraulic port.

In accordance with an eighteenth aspect of the present invention, the bicycle disc brake caliper according to any one of the first to seventeenth aspects is configured so that the caliper body further includes a third cylinder bore and a fourth cylinder bore. The third cylinder bore is provided on the second body portion to face the first cylinder bore. The fourth cylinder bore is provided on the second body portion to face the second cylinder bore.

With the bicycle disc brake caliper according to the eighteenth aspect, it is possible to stably apply the larger braking force to the disc brake rotor using the first to fourth cylinder bores.

In accordance with a nineteenth aspect of the present invention, the bicycle disc brake caliper according to the eighteenth aspect is configured so that the first cylinder bore has a first maximum inner diameter. The second cylinder bore has a second maximum inner diameter. The third cylinder bore has a third maximum inner diameter equal to the first maximum inner diameter. The fourth cylinder bore has a fourth maximum inner diameter equal to the second maximum inner diameter.

With the bicycle disc brake caliper according to the nineteenth aspect, it is possible to appropriately apply a braking force to a disc brake rotor in accordance with a rotational direction of the disc brake rotor.

In accordance with a twentieth aspect of the present invention, the bicycle disc brake caliper according to any one of the first to nineteenth aspect is configured so that the mounting surface includes a first surface and a second surface spaced apart from the first surface. The first receiving hole is provided on the first surface. The second receiving hole is provided on the second surface.

With the bicycle disc brake caliper according to the twentieth aspect, it is possible to adapt the structure of the mounting surface to the pipe portion of the bicycle body.

In accordance with a twenty-first aspect of the present invention, the bicycle disc brake caliper according to any one of the first to twentieth aspects is configured so that the mounting surface is provided on the first body portion. The first body portion is farther from a center longitudinal plane of the bicycle body than the second body portion in the mounted state.

With the bicycle disc brake caliper according to the twenty-first aspect, it is possible to arrange the mounting surface at a position closer to the pipe portion of the bicycle body.

In accordance with a twenty-second aspect of the present invention, the bicycle disc brake caliper according to any one of the first to twenty-first aspects is configured so that the caliper body includes a hydraulic port to which a hydraulic hose is adjustably coupled.

With the bicycle disc brake caliper according to the twenty-second aspect, it is possible to couple the hydraulic hose to the hydraulic port with flexibility.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
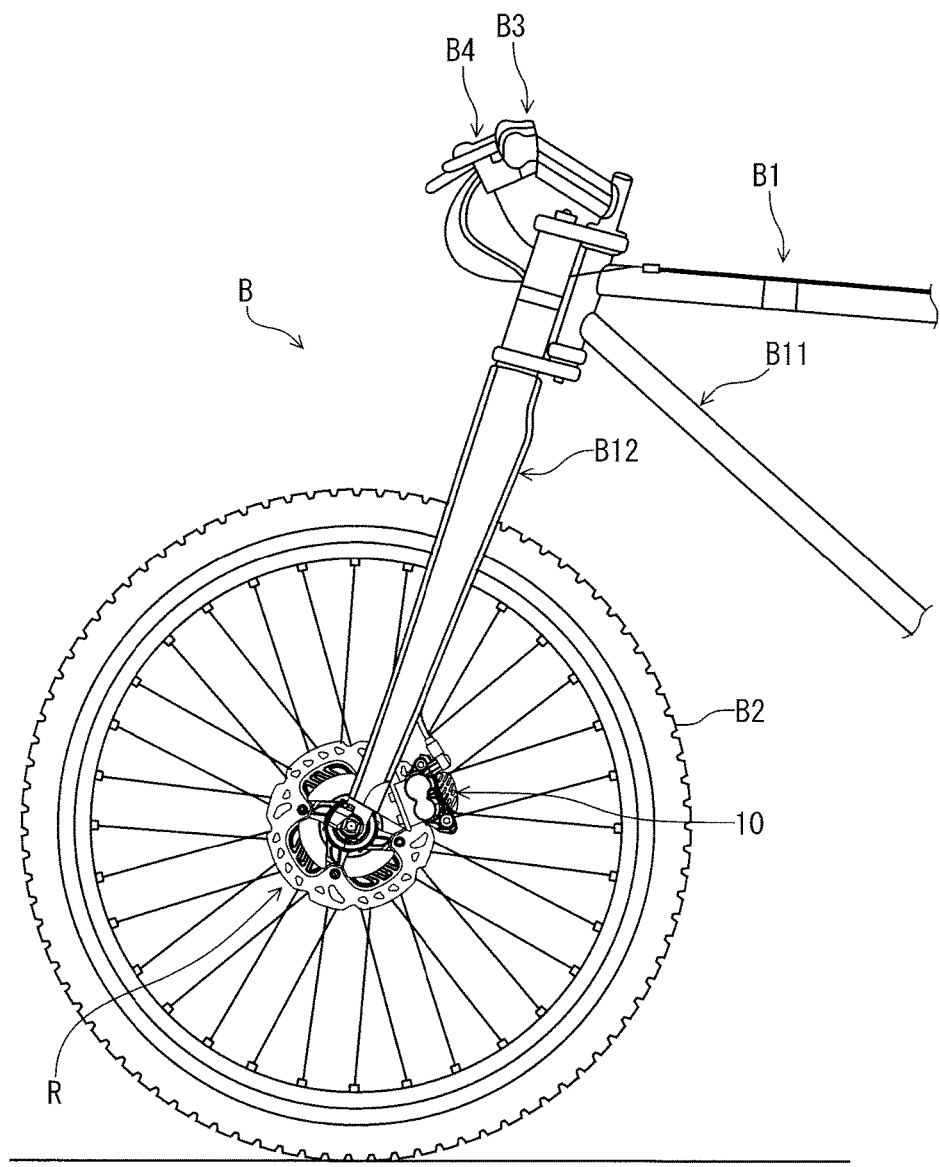
FIG. 1 is a side elevational view of a front portion of a bicycle with a bicycle disc brake caliper in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle B includes a bicycle disc brake caliper 10 in accordance with a first embodiment. The bicycle B further includes a bicycle body B1, a front wheel B2, a rear wheel (not shown), a drive train (not shown), a handlebar B3, and a hydraulic operating device B4. The bicycle body B1 includes a bicycle frame B11 and a front fork B12 rotatably coupled to the bicycle frame B11. The front wheel B2 is rotatably mounted to the front fork B12. The handlebar B3 is attached to the front fork column by a stem [A1]|[Nishino2]. The rear wheel is rotatably mounted to chain stays of the bicycle frame B11.

Figure 2:
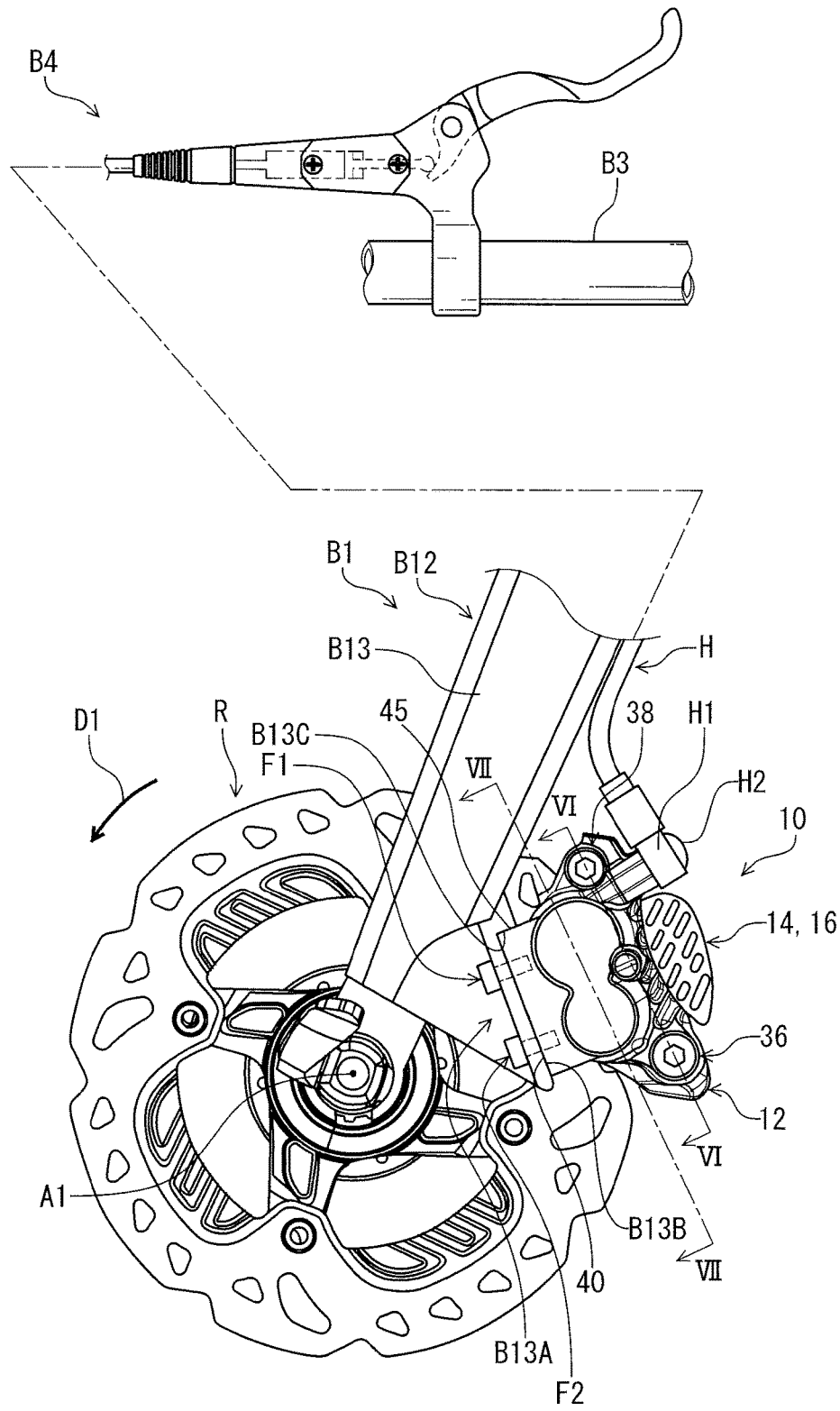
FIG. 2 is a partial side elevational view of the bicycle disc brake caliper with a hydraulic operating device.

As seen in FIG. 2, the bicycle disc brake caliper 10 comprises a caliper body 12. The bicycle disc brake caliper 10 is connected to the hydraulic operating device B4 with a hydraulic hose H. The bicycle disc brake caliper 10 is configured to apply a braking force to a disc brake rotor R coupled to the front wheel B2. The disc brake rotor R is rotatably mounted to the bicycle body B1 about a rotational axis A1. The caliper body 12 is configured to be mounted to a pipe portion B13 of the bicycle body B1. In this embodiment, the caliper body 12 is configured to be mounted to the pipe portion B13 of the front fork B12. The bicycle disc brake caliper 10 is a front hydraulic brake caliper. However, the structure of the bicycle disc brake caliper 10 can be applied to a rear hydraulic brake caliper. In such an embodiment, the caliper body 12 is mounted to a pipe portion (e.g., the chain stay) of the bicycle frame B11 (FIG. 1).

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the handlebar B3. Accordingly, these terms, as utilized to describe the bicycle disc brake caliper 10, should be interpreted relative to the bicycle B equipped with the bicycle disc brake caliper 10 as used in an upright riding position on a horizontal surface.

Figure 3:
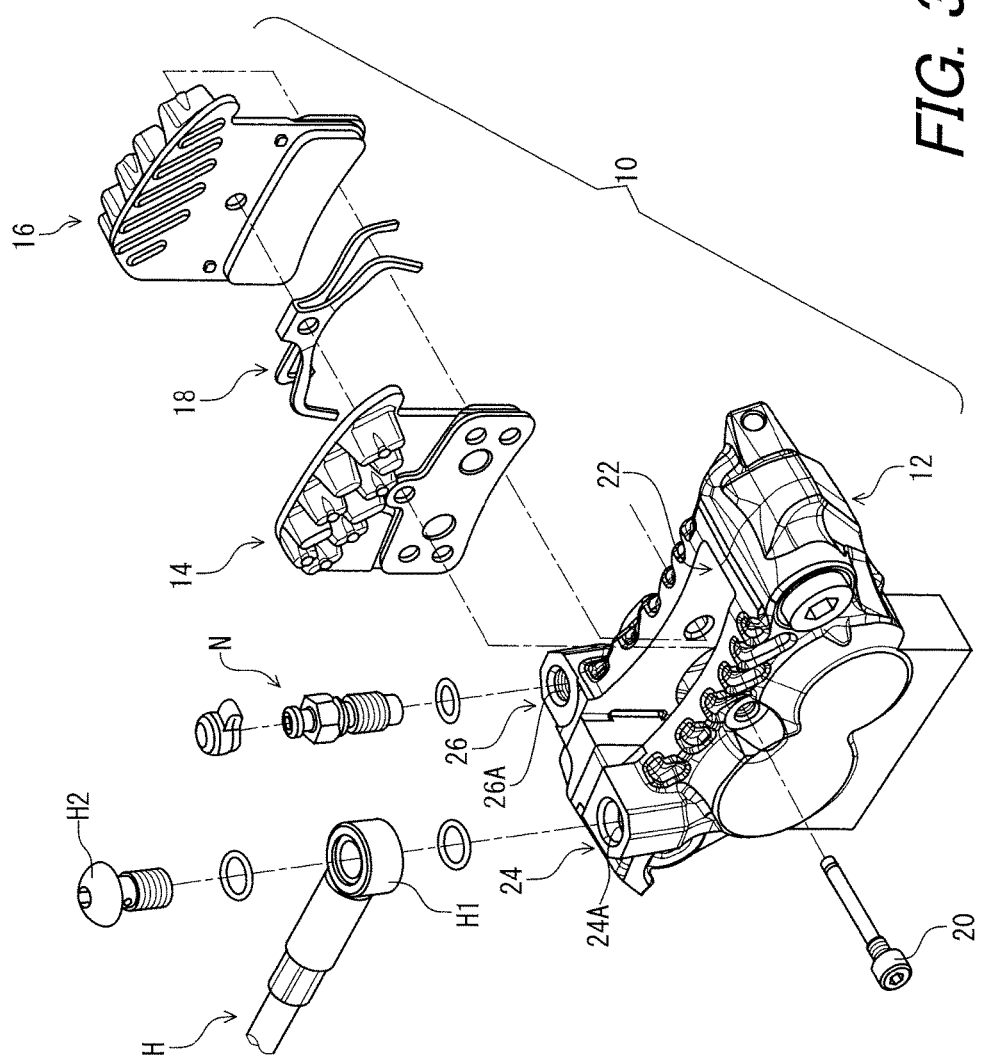
FIG. 3 is an exploded perspective view of the bicycle disc brake caliper illustrated in FIG. 1.

As seen in FIG. 3, the bicycle disc brake caliper 10 comprises a pair of brake pads 14 and 16 and a pad spring 18. The brake pads 14 are movably coupled to the caliper body 12 with a pad pin 20. The pad spring 18 is provided between the brake pads 14 and 16 to bias the brake pads away from each other. The caliper body 12 includes a slot 22 in which the brake pad is arranged. In this embodiment, the brake pads 14 and 16 are movably arranged in the slot 22.

The caliper body 12 includes a hydraulic port 24 to which the hydraulic hose H is adjustably coupled. A banjo H1 of the hydraulic hose H is connected to the hydraulic port 24 with a banjo bolt H2. The hydraulic port 24 includes a threaded hole 24A. The banjo bolt H2 is threadedly engaged with the threaded hole 24A. An orientation of the hydraulic hose H is adjustable relative to the caliper body 12 in a state where the banjo bolt H2 is loosened.

The caliper body 12 includes an additional hydraulic port 26. A bleed nipple N is connected to the hydraulic port 24. The additional hydraulic port 26 includes an additional threaded hole 26A. The bleed nipple N is threadedly engaged with the additional threaded hole 26A. However, the bleed nipple N can be connected to the hydraulic port 24, and the hydraulic hose H can be connected to the additional hydraulic port 26.

Figure 4:
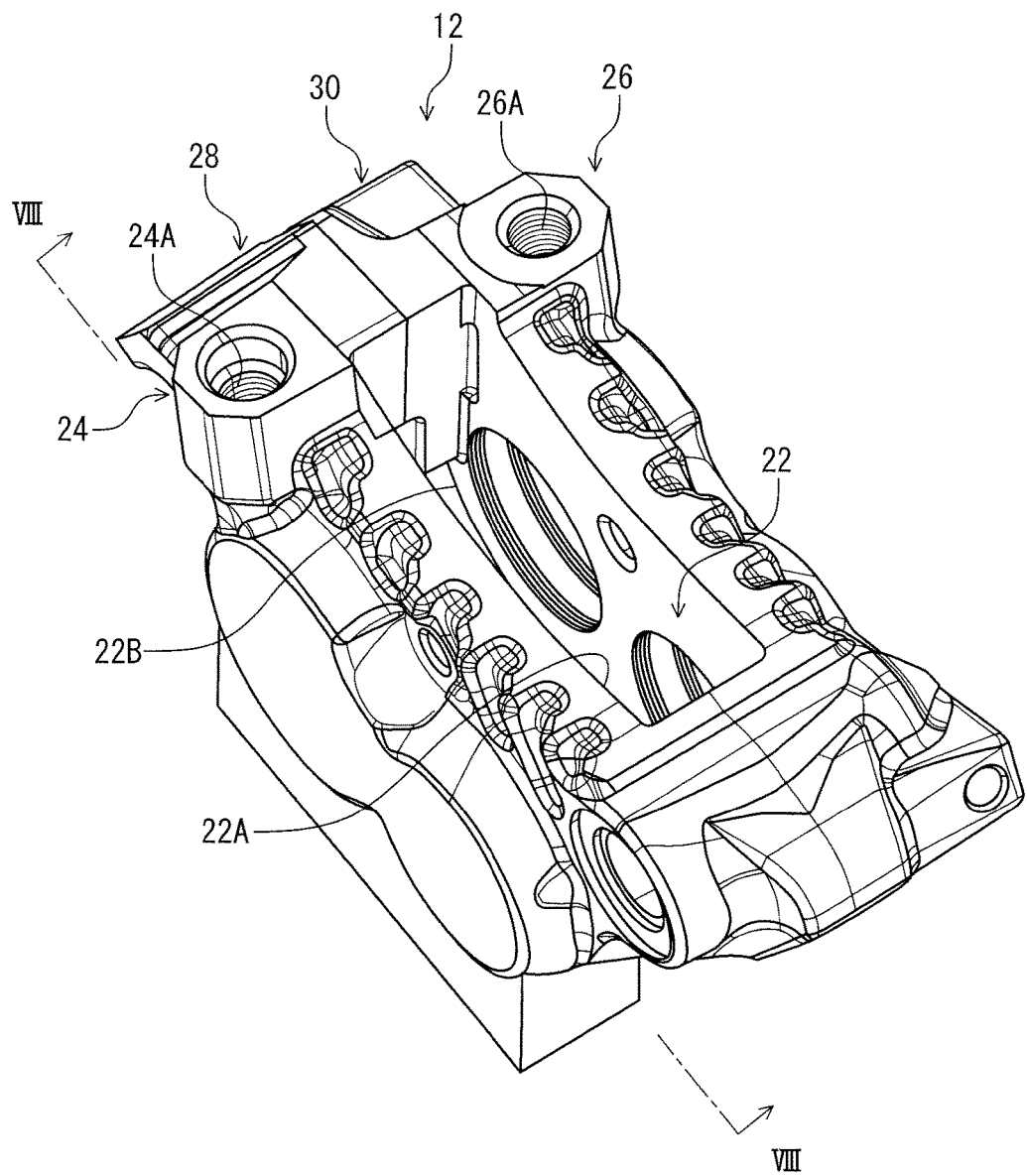
FIG. 4 is a perspective view of a caliper body of the bicycle disc brake caliper illustrated in FIG. 1.

As seen in FIG. 4, the caliper body 12 includes a first body portion 28 and a second body portion 30. The first body portion 28 and the second body portion 30 are divided by the slot 22. The slot 22 is provided between the first body portion 28 and the second body portion 30. In other words, connecting locations of the hydraulic hose H and the bleed nipple N are interchangeable. Further, the connecting locations on the caliper body 12 are freely selected in accordance with requirement.

Figure 5:
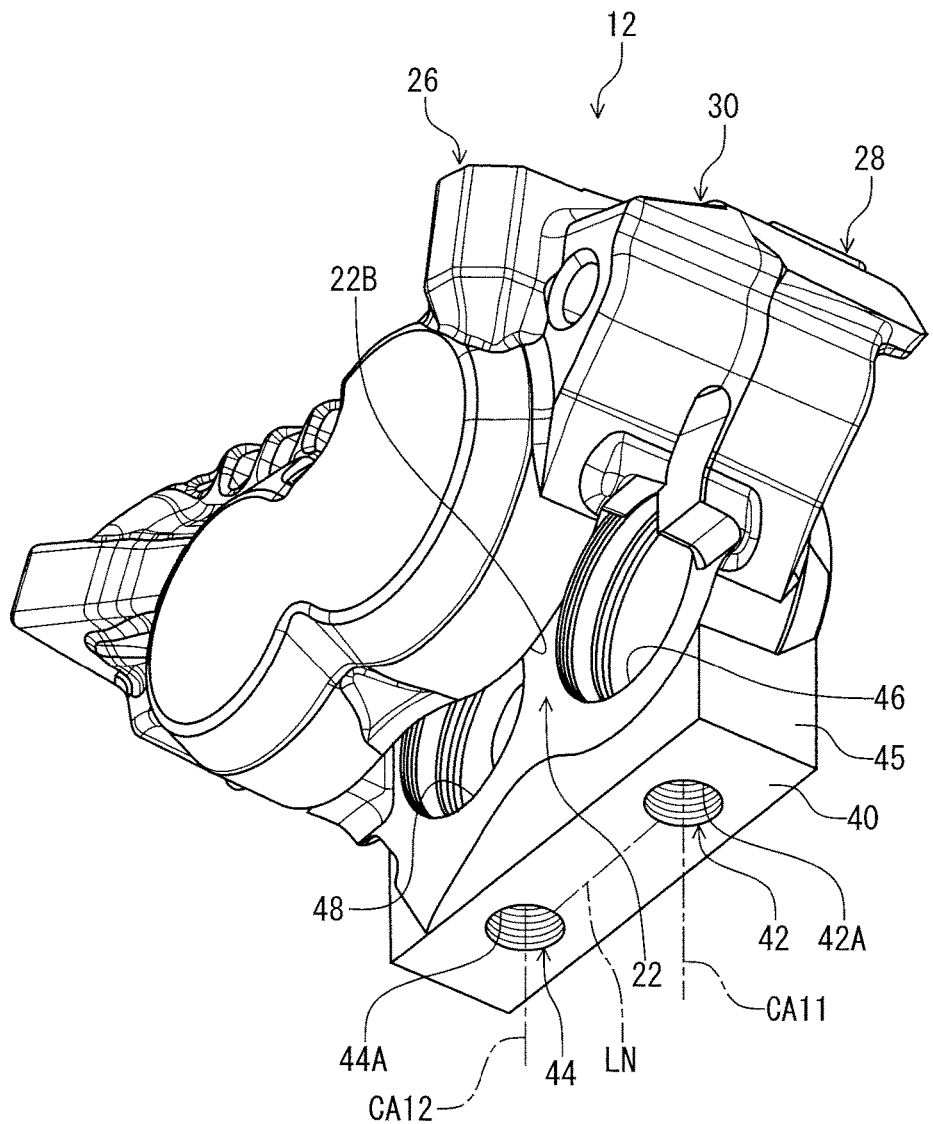
FIG. 5 is another perspective view of the caliper body of the bicycle disc brake caliper illustrated in FIG. 1.

As seen in FIGS. 4 and 5, the slot 22 includes a first end opening 22A (FIG. 4) and a second end opening 22B. The slot 22 extends between the first end opening 22A and the second end opening 22B. However, one of the first end opening 22A and the second end opening 22B can be omitted from the caliper body 12.

Figure 6:
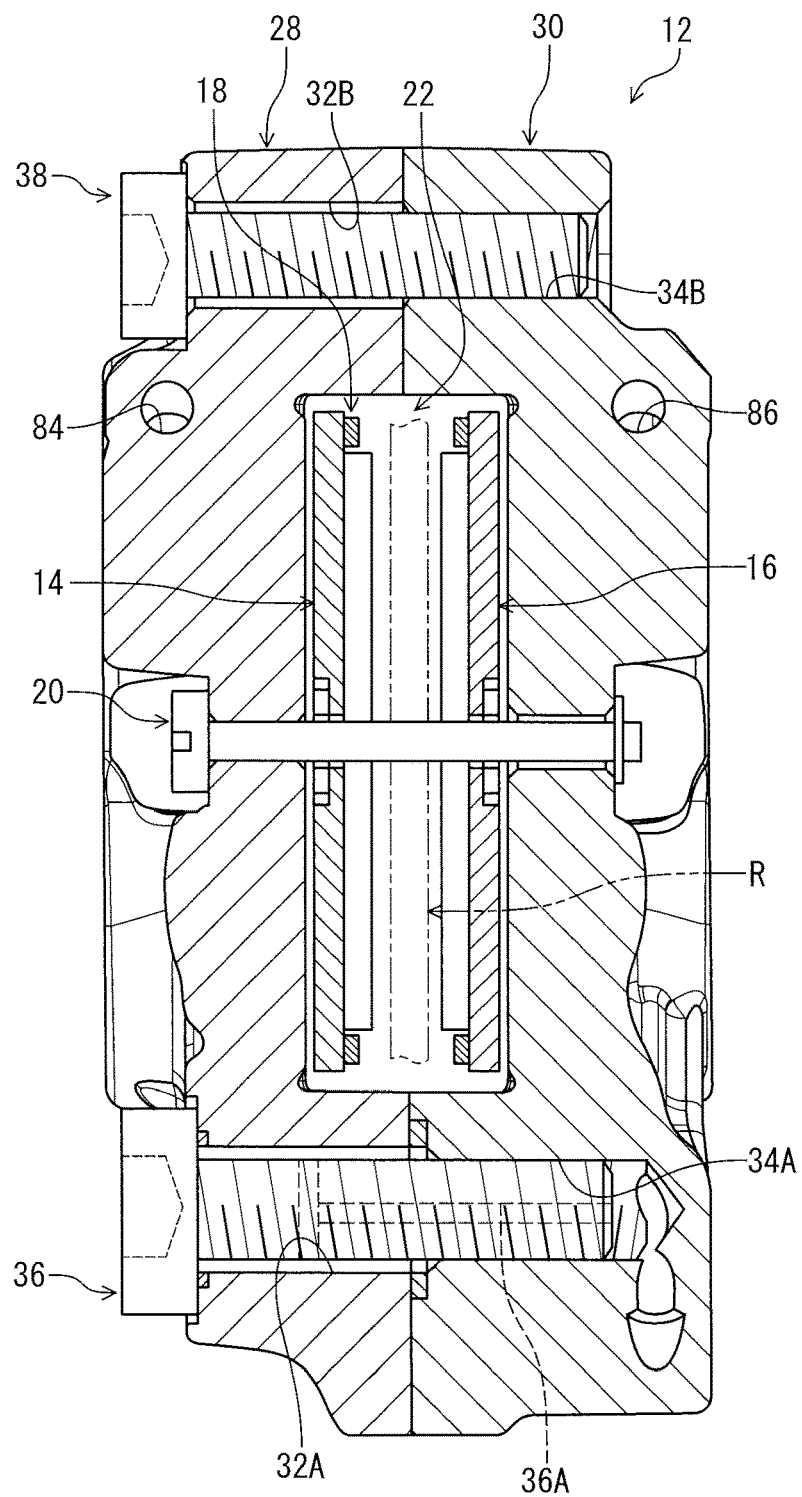
FIG. 6 is a cross-sectional view of the bicycle disc brake caliper taken along line VI-VI of FIG. 1.

As seen in FIG. 6, the first body portion 28 is a separate member from the second body portion 30. The second body portion 30 is coupled to the first body portion 28 so as to provide the slot 22 therebetween. However, the first body portion 28 can be integrally provided with the second body portion 30 as a one-piece unitary member.

The first body portion 28 is coupled to the second body portion 30 with a first fastener 36 and a second fastener 38. The first body portion 28 includes a first through-hole 32A and a second through-hole 32B. The second body portion 30 include a first coupling threaded hole 34A and a second coupling threaded hole 34B. The first fastener 36 extends through the first through-hole 32A and is threadedly engaged with the first coupling threaded hole 34A. The second fastener 38 extends through the second through-hole 32B and is threadedly engaged with the second coupling threaded hole 34B.

As seen in FIG. 5, the caliper body 12 includes a mounting surface 40 configured to face the pipe portion B13 of the bicycle body B1 in a mounted state where the bicycle disc brake caliper 10 is mounted to the bicycle body B1 (FIG. 2). In this embodiment, the mounting surface 40 is provided on the first body portion 28. However, the mounting surface 40 can be provided on the second body portion 30.

The caliper body 12 includes a first receiving hole 42 provided on the mounting surface 40. The first receiving hole 42 is configured to be threadedly engaged with a fastener F1 (FIG. 2) to mount the bicycle disc brake caliper 10 to the bicycle body B1. In this embodiment, the first receiving hole 42 includes a first threaded hole 42A having a first center axis CA11. The fastener F1 (FIG. 2) is threadedly engaged with the first threaded hole 42A.

The caliper body 12 further includes a second receiving hole 44 provided on the mounting surface 40. The second receiving hole 44 is configured to be threadedly engaged with a fastener F2 (FIG. 2) to mount the bicycle disc brake caliper 10 to the bicycle body B1. In this embodiment, the second receiving hole 44 includes a second threaded hole 44A having a second center axis CA12. The fastener F2 (FIG. 2) is threadedly engaged with the second threaded hole 44A.

At least one of the first receiving hole 42 and the second receiving hole 44 can be provided on a separate receiving member having a threaded hole. Examples of the separate receiving member include a nut. In such an embodiment, the separate receiving member is provided in the caliper body 12. For example, the separate receiving member is provided in a slit formed at the caliper body 12.

As seen in FIG. 2, the pipe portion B13 includes a receiving part B13A. The receiving part B13A includes a receiving surface B13B. The mounting surface 40 of the caliper body 12 is in contact with the receiving surface B13B in the mounting state of the bicycle disc brake caliper 10. Furthermore, the receiving part B13A includes an additional receiving surface B13C. The caliper body 12 includes an additional mounting surface 45. The additional mounting surface 45 faces in the driving rotational direction D1 of the disc brake rotor R. The additional mounting surface 45 is in contact with the additional receiving surface B13C in the mounting state of the bicycle disc brake caliper 10.

As seen in FIG. 5, no portion of the caliper body 12 extends beyond the mounting surface 40 in a direction toward the bicycle body B1 (FIG. 2) along a line LN extending directly between the first threaded hole 42A and the second threaded hole 44A. The mounting surface 40 has a flat shape. However, the mounting surface 40 can have other shapes.

The caliper body 12 includes a first cylinder bore 46 and a second cylinder bore 48. The first cylinder bore 46 is provided on the first body portion 28. The second cylinder bore 48 is provided on the first body portion 28. In other words, the first body portion 28 has a plurality of cylinder bores and the plurality of cylinder bores includes the first cylinder bore 46 and the second cylinder bore 48. A total number of cylinder bores provided on the first body portion 28 is not limited to two. The first body portion 28 can include at least three cylinder bores.

Figure 7:
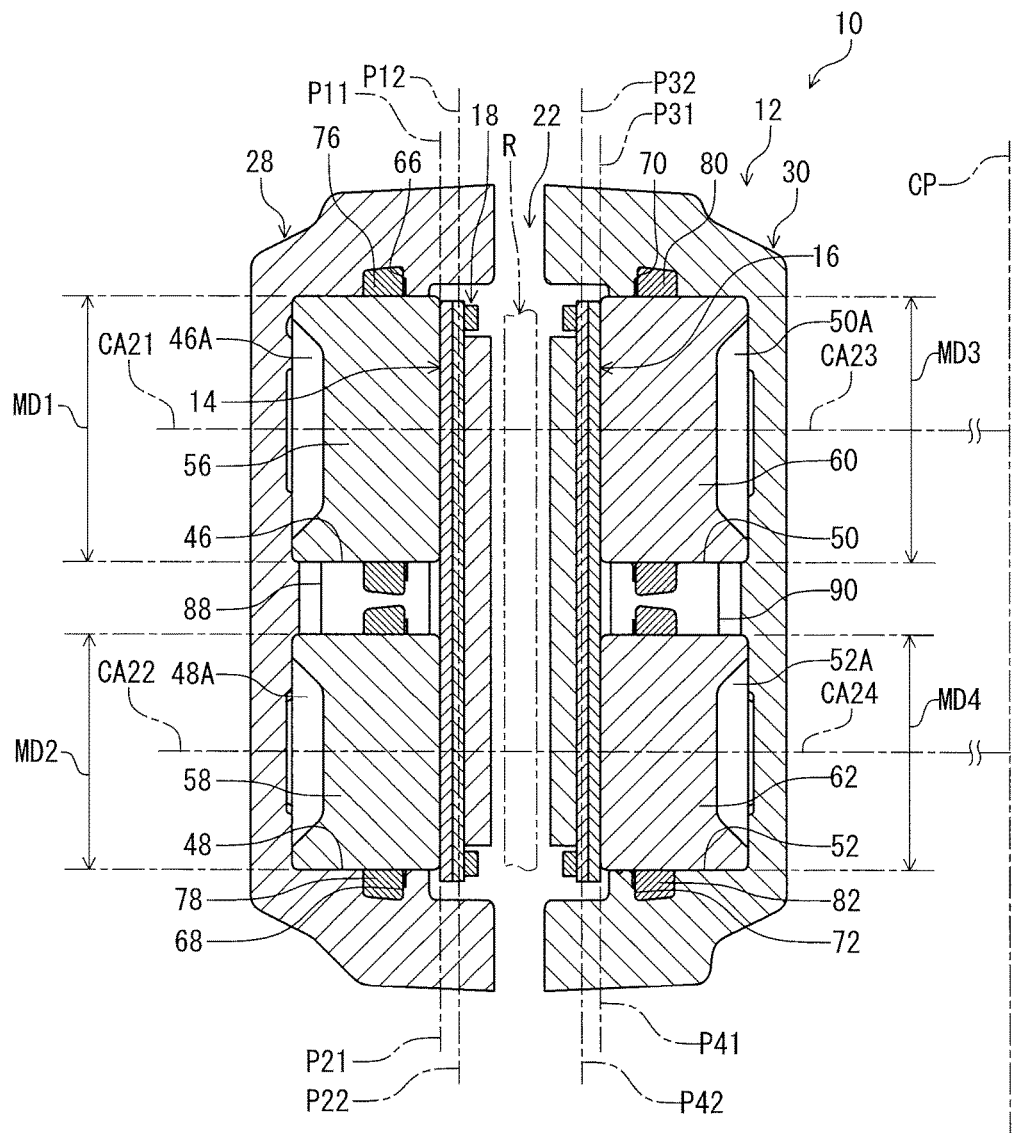
FIG. 7 is a cross-sectional view of the bicycle disc brake caliper taken along line VII-VII of FIG. 1.

As seen in FIG. 7, the first cylinder bore 46 has a first cylinder center axis CA21. The second cylinder bore 48 has a second cylinder center axis CA22. In this embodiment, the second cylinder center axis CA22 is parallel to the first cylinder center axis CA21. However, the positional relationship between the first cylinder center axis CA21 and the second cylinder center axis CA22 is not limited to this embodiment.

The first cylinder bore 46 has a first maximum inner diameter MD1. The second cylinder bore 48 has a second maximum inner diameter MD2. In this embodiment, the first maximum inner diameter MD1 is different from the second maximum inner diameter MD2. The first maximum inner diameter MD1 is larger than the second maximum inner diameter MD2. However, the first maximum inner diameter MD1 can be equal to or smaller than the second maximum inner diameter MD2.

As seen in FIG. 7, the caliper body 12 further includes a third cylinder bore 50 and a fourth cylinder bore 52. The third cylinder bore 50 is provided on the second body portion 30 to face the first cylinder bore 46. The fourth cylinder bore 52 is provided on the second body portion 30 to face the second cylinder bore 48. In other words, the second body portion 30 has a plurality of cylinder bores and the plurality of cylinder bores includes the third cylinder bore 50 and the fourth cylinder bore 52. A total number of cylinder bores provided on the second body portion 30 is not limited to two. The second body portion 30 can include at least three cylinder bores.

The third cylinder bore 50 has a third cylinder center axis CA23. The fourth cylinder bore 52 has a fourth cylinder center axis CA24. In this embodiment, the fourth cylinder center axis CA24 is parallel to the third cylinder center axis CA23. However, the positional relationship between the third cylinder center axis CA23 and the fourth cylinder center axis CA24 is not limited to this embodiment.

The third cylinder bore 50 has a third maximum inner diameter MD3. The fourth cylinder bore 52 has a fourth maximum inner diameter MD4. In this embodiment, the third maximum inner diameter MD3 is different from the fourth maximum inner diameter MD4. The third maximum inner diameter MD3 is larger than the fourth maximum inner diameter MD4. However, the third maximum inner diameter MD3 can be equal to or smaller than the fourth maximum inner diameter MD4.

In this embodiment, the third maximum inner diameter MD3 is equal to the first maximum inner diameter MD1. The fourth maximum inner diameter MD4 is equal to the second maximum inner diameter MD2. However, the third maximum inner diameter MD3 can be different from the first maximum inner diameter MD1. The fourth maximum inner diameter MD4 can be different from the second maximum inner diameter MD2.

As seen in FIG. 7, the third cylinder bore 50 is provided coaxially with the first cylinder bore 46. The fourth cylinder bore 52 is provided coaxially with the second cylinder bore 48. The third cylinder center axis CA23 coincides with the first cylinder center axis CA21. The fourth cylinder center axis CA24 coincides with the second cylinder center axis CA22. However, a positional relationship between the first cylinder bore 46 and the third cylinder bore 50 is not limited to this embodiment. A positional relationship between the second cylinder bore 48 and the fourth cylinder bore 52 is not limited to this embodiment.

The bicycle disc brake caliper 10 comprises a first piston 56, a second piston 58, a third piston 60, and a fourth piston 62. The first piston 56 is movably provided in the first cylinder bore 46. The second piston 58 is movably provided in the second cylinder bore 48. The third piston 60 is movably provided in the third cylinder bore 50. The fourth piston 62 is movably provided in the fourth cylinder bore 52.

The first piston 56 is movable relative to the caliper body 12 along the first cylinder center axis CA21 between a first rest position P11 and a first actuated position P12. The second piston 58 is movable relative to the caliper body 12 along the second cylinder center axis CA22 between a second rest position P21 and a second actuated position P22. The third piston 60 is movable relative to the caliper body 12 along the third cylinder center axis CA23 between a third rest position P31 and a third actuated position P32. The fourth piston 62 is movable relative to the caliper body 12 along the fourth cylinder center axis CA24 between a fourth rest position P41 and a fourth actuated position P42.

The caliper body 12 includes a first annular groove 66, a second annular groove 68, a third annular groove 70, and a fourth annular groove 72. The first annular groove 66 is provided on an inner peripheral surface of the first cylinder bore 46. The second annular groove 68 is provided on an inner peripheral surface of the second cylinder bore 48. The third annular groove 70 is provided on an inner peripheral surface of the third cylinder bore 50. The fourth annular groove 72 is provided on an inner peripheral surface of the fourth cylinder bore 52.

The caliper body 12 includes a first seal ring 76, a second seal ring 78, a third seal ring 80, and a fourth seal ring 82. The first seal ring 76 is provided in the first annular groove 66 to contact the first piston 56. The second seal ring 78 is provided in the second annular groove to contact the second piston 58. The third seal ring 80 is provided in the third annular groove 70 to contact the third piston 60. The fourth seal ring 82 is provided in the fourth annular groove 72 to contact the fourth piston 62.

The first cylinder bore 46, the first piston 56, and the first seal ring 76 define a first hydraulic chamber 46A. The second cylinder bore 48, the second piston 58, and the second seal ring 78 define a second hydraulic chamber 48A. The third cylinder bore 50, the third piston 60, and the third seal ring 80 define a third hydraulic chamber 50A. The fourth cylinder bore 52, the fourth piston 62, and the fourth seal ring 82 define a fourth hydraulic chamber 52A.

As seen in FIG. 7, the first body portion 28 is farther from a center longitudinal plane CP of the bicycle body B1 than the second body portion 30 in the mounted state. The center longitudinal plane CP is defined at a transverse center position of the bicycle frame B11 (FIG. 1). The center longitudinal plane CP is perpendicular to the first to fourth cylinder center axes CA21 to CA24. The first body portion 28 can be closer to the center longitudinal plane CP of the bicycle body B1 than the second body portion 30 in the mounted state.

Figure 8:
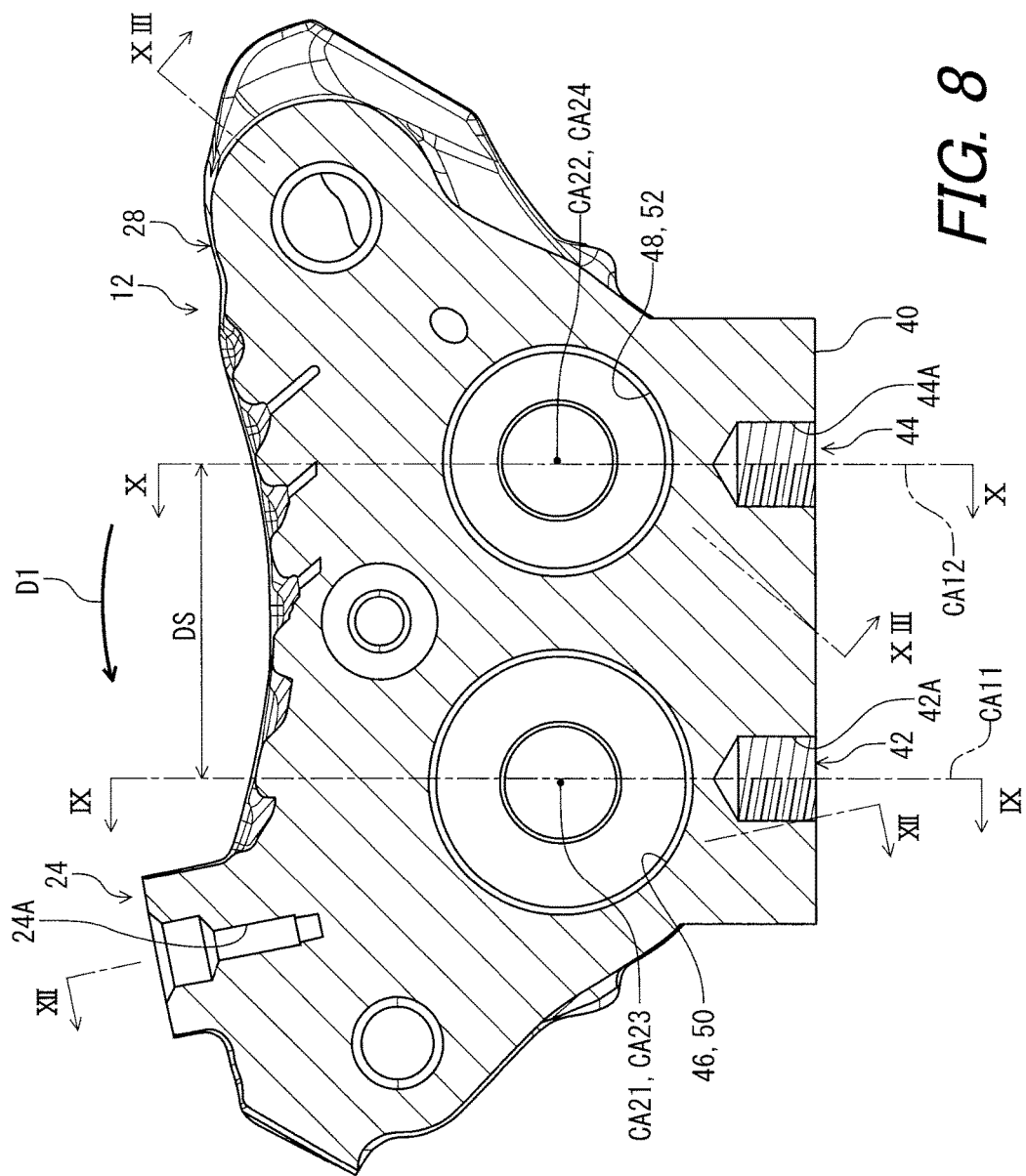
FIG. 8 is a cross-sectional view of the bicycle disc brake caliper taken along line VIII-VIII of FIG. 4.

As seen in FIG. 8, the first cylinder center axis CA21 is non-parallel to the first center axis CA11. The second cylinder center axis CA22 is non-parallel to the second center axis CA12. The third cylinder center axis CA23 is non-parallel to the first center axis CA11. The fourth cylinder center axis CA24 is non-parallel to the second center axis CA12.

The first cylinder bore 46 is provided on a downstream side of the second cylinder bore 48 in a driving rotational direction D1 (FIG. 2) in which the disc brake rotor R is rotated relative to the bicycle disc brake caliper 10 in a driving state where a bicycle is forwardly moved. The first cylinder bore 46 is closer to the hydraulic port 24 than the second cylinder bore 48. However, the first cylinder bore 46 can be provided on an upstream side of the second cylinder bore 48 in the driving rotational direction D1. The first cylinder bore 46 can be farther from the hydraulic port 24 than the second cylinder bore 48.

As seen in FIG. 8, the first cylinder center axis CA21 is offset from the first center axis CA11. The second cylinder center axis CA22 is offset from the second center axis CA12. In this embodiment, the first cylinder center axis CA21 is offset from the first center axis CA11 toward an opposite side of the second cylinder center axis CA22. The second cylinder center axis CA22 is offset from the second center axis CA12 toward an opposite side of the first cylinder center axis CA21. However, the first cylinder center axis CA21 can be offset from the first center axis CA11 toward the second cylinder center axis CA22. The second cylinder center axis CA22 can be offset from the second center axis CA12 toward the first cylinder center axis CA21. Furthermore, the first cylinder center axis CA21 can be defined to intersect with the first center axis CA11. The second cylinder center axis CA22 can be defined to intersect with the second center axis CA12. In this embodiment, the second center axis CA12 is parallel to the first center axis CA11. However, the second center axis CA12 can be defined to be non-parallel to the first center axis CA11.

A distance DS between the first center axis CA11 and the second center axis CA12 is equal to or larger than 15 mm and is equal to or smaller than 55 mm. The distance DS preferably is equal to or larger than 30 mm and is equal to or smaller than 40 mm. In this embodiment, the distance DS is approximately 34 mm. However, the distance DS can be smaller than 15 mm and can be larger than 55 mm. The distance DS is not limited to this embodiment and the above ranges.

Figure 9:
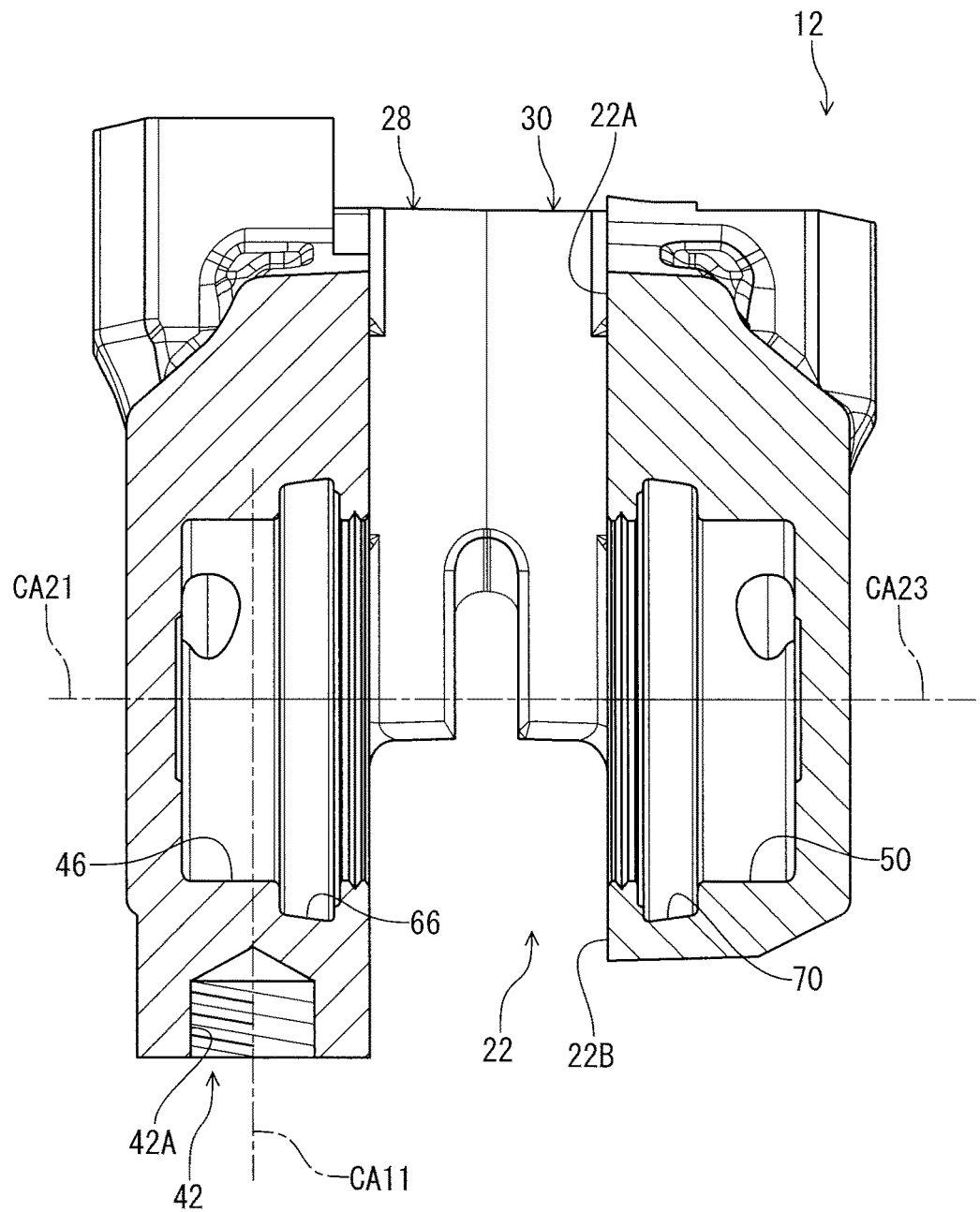
FIG. 9 is a cross-sectional view of the bicycle disc brake caliper taken along line IX-IX of FIG. 8.

As seen in FIG. 9, the first cylinder center axis CA21 is perpendicular to the first center axis CA11 as viewed in a direction perpendicular to both the first center axis CA11 and the first cylinder center axis CA21. The third cylinder center axis CA23 is perpendicular to the first center axis CA11 as viewed in a direction perpendicular to both the first center axis CA11 and the third cylinder center axis CA23. The first center axis CA11 extends through the first cylinder bore 46. The first receiving hole 42 extend from the mounting surface 40 toward the first cylinder bore 46.

Figure 10:
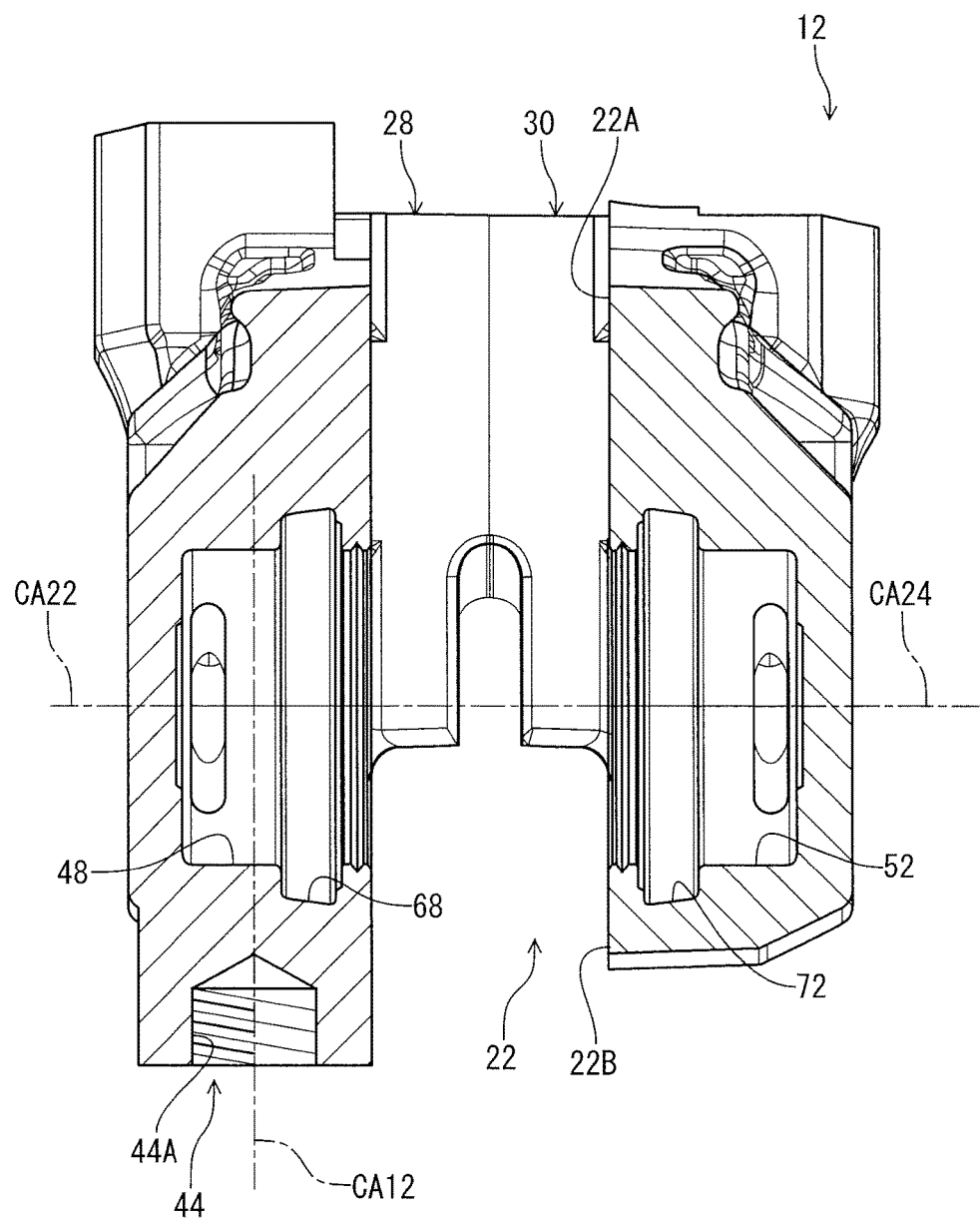
FIG. 10 is a cross-sectional view of the bicycle disc brake caliper taken along line X-X of FIG. 8.

As seen in FIG. 10, the second cylinder center axis CA22 is perpendicular to the second center axis CA12 as viewed in a direction perpendicular to both the second center axis CA12 and the second cylinder center axis CA22. The fourth cylinder center axis CA24 is perpendicular to the second center axis CA12 as viewed in a direction perpendicular to both the second center axis CA12 and the fourth cylinder center axis CA24. The second center axis CA12 extends through the second cylinder bore 48. The second receiving hole 44 extends from the mounting surface 40 toward the second cylinder bore 48.

Figure 11:
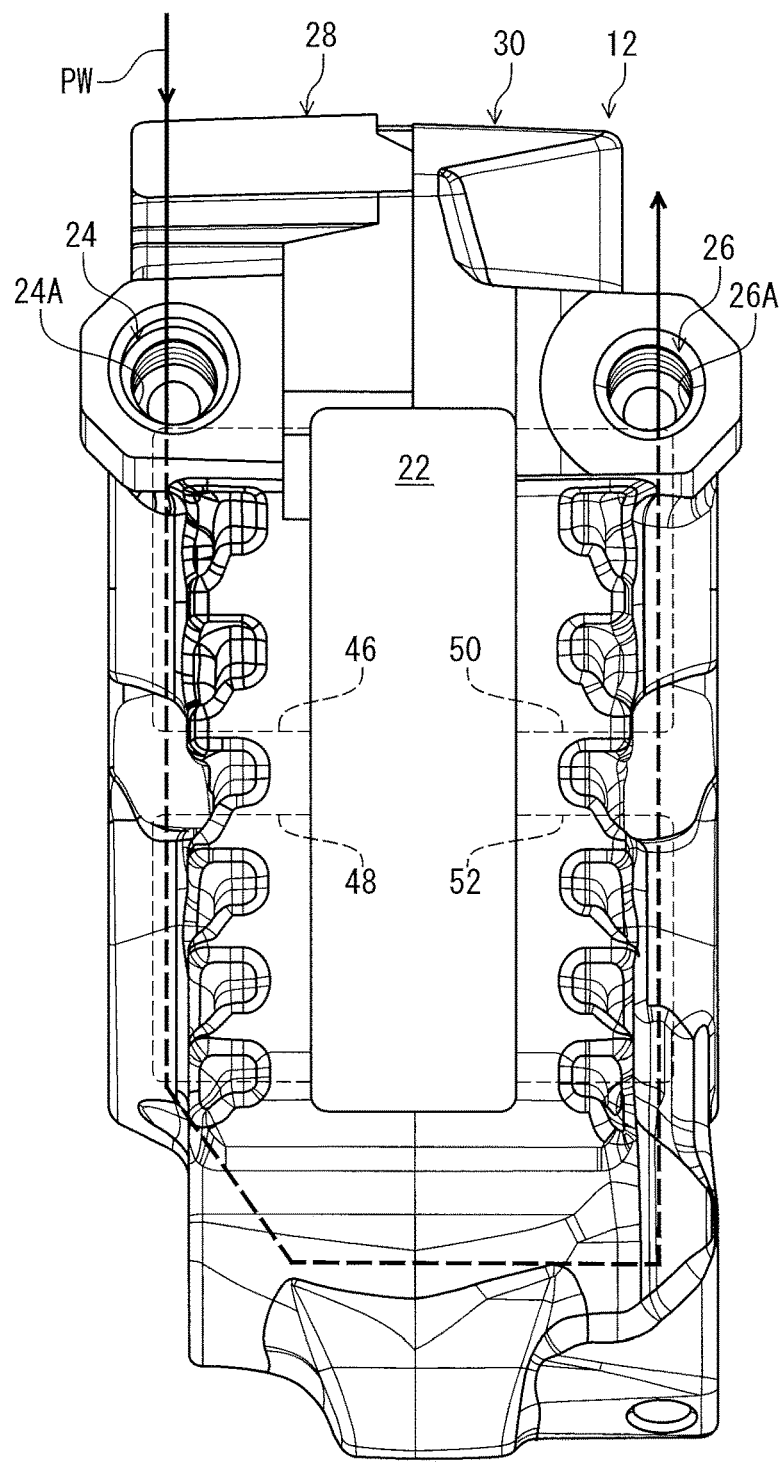
FIG. 11 is a plan view of the caliper body of the bicycle disc brake caliper illustrated in FIG. 1.

As seen in FIG. 11, the caliper body 12 includes a fluid passageway PW. The fluid passageway PW is provided in the caliper body 12 as a single passageway. The fluid passageway PW extends from the hydraulic port 24 to the additional hydraulic port 26.

Figure 12:
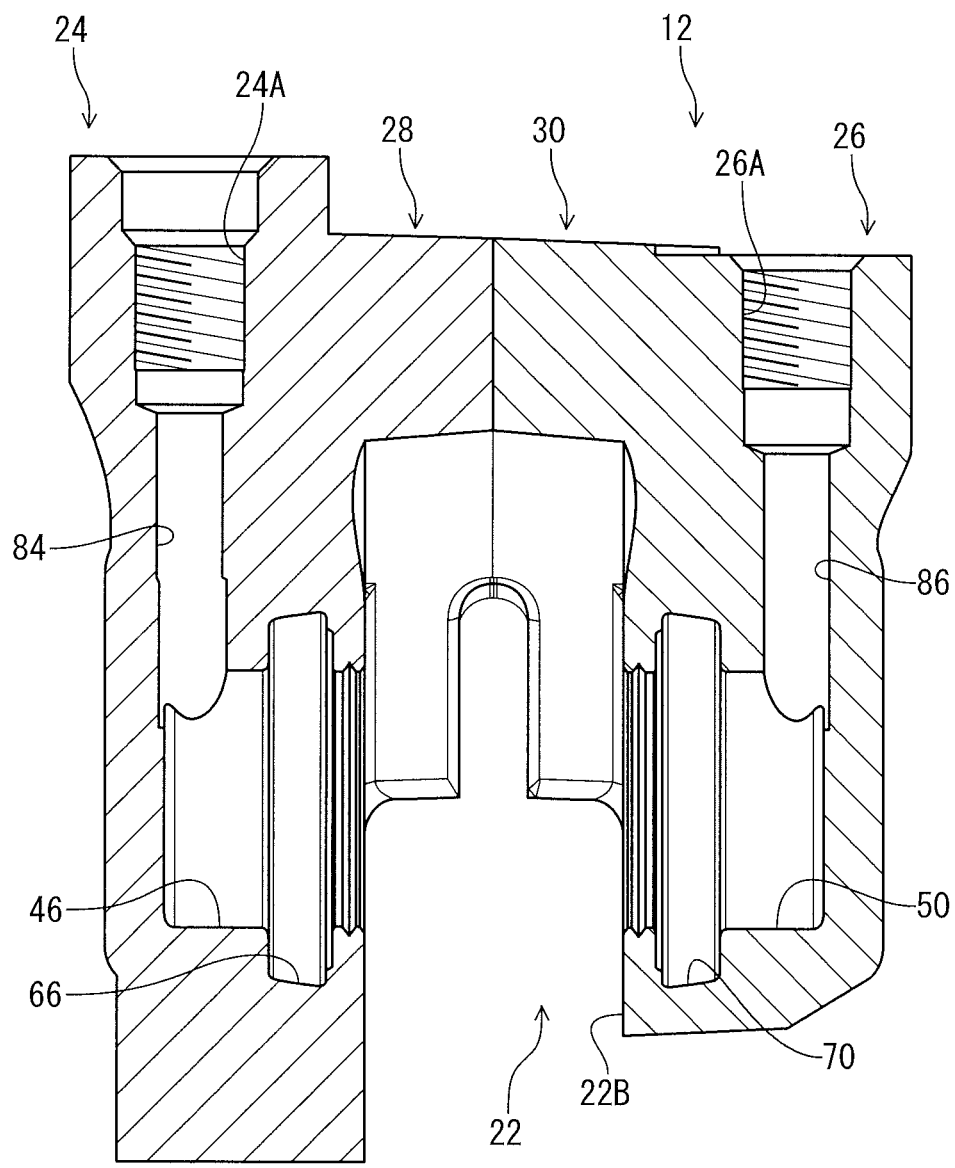
FIG. 12 is a cross-sectional view of the bicycle disc brake caliper taken along line XII-XII of FIG. 8.

As seen in FIG. 12, the caliper body 12 includes communication holes 84 and 86. The communication hole 84 connects the hydraulic port 24 (the threaded hole 24A) to the first cylinder bore 46 (the first hydraulic chamber 46A). The communication hole 86 connects the additional hydraulic port 26 (the additional threaded hole 26A) to the third cylinder bore 50 (the third hydraulic chamber 50A).

As seen in FIG. 7, the caliper body 12 includes communication holes 88 and 90. The communication hole 88 connects the first cylinder bore 46 (the first hydraulic chamber 46A) to the second cylinder bore 48 (the second hydraulic chamber 48A). The communication hole 90 connects the third cylinder bore 50 (the third hydraulic chamber 50A) to the fourth cylinder bore 52 (the fourth hydraulic chamber 52A).

Figure 13:
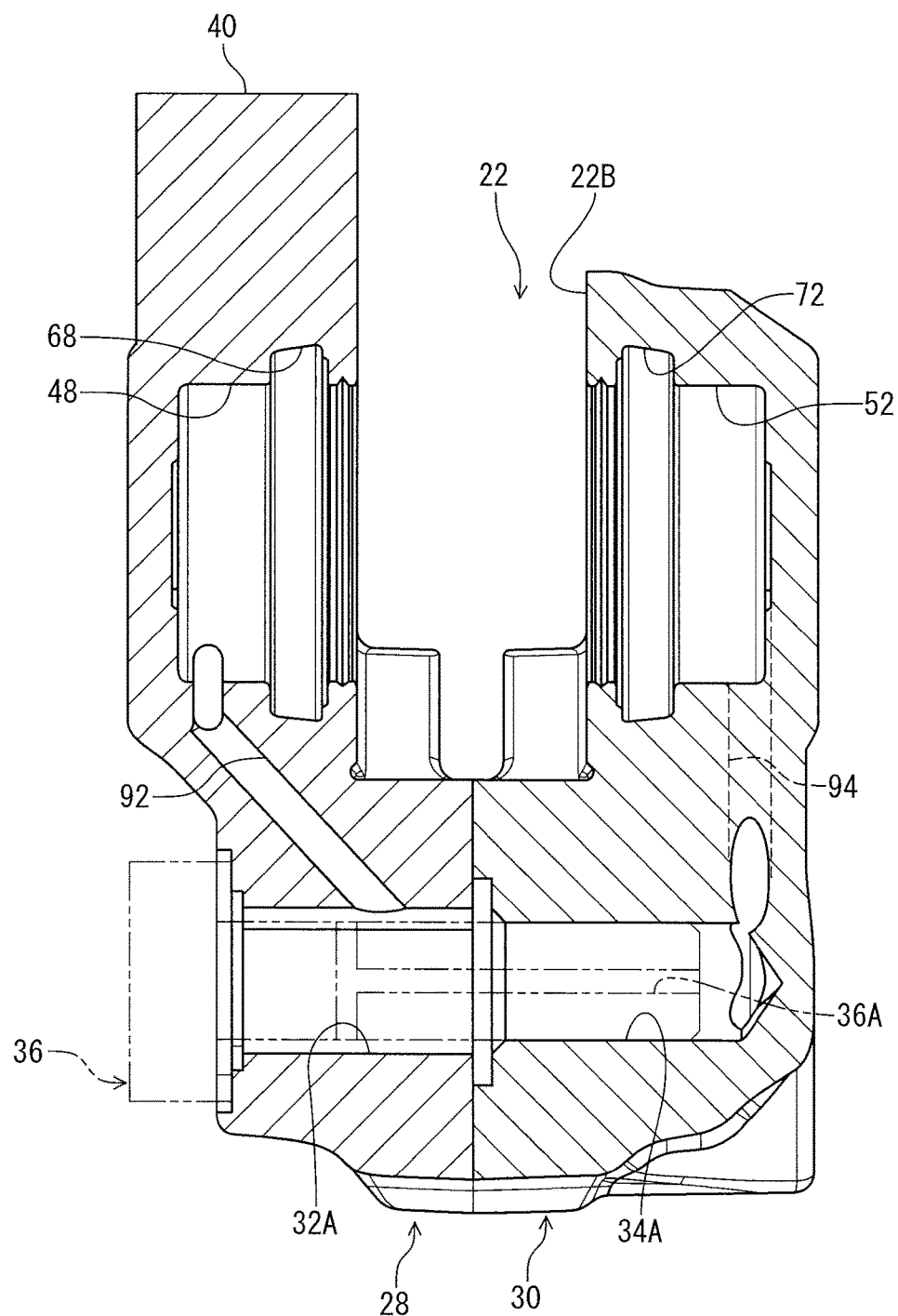
FIG. 13 is a cross-sectional view of the bicycle disc brake caliper taken along line XIII-XIII of FIG. 8.

As seen in FIG. 13, the caliper body 12 includes communication holes 92 and 94. The communication hole 92 connects the second cylinder bore 48 (the second hydraulic chamber 48A) to the first through-hole 32A. The communication hole 94 connects the fourth cylinder bore 52 (the fourth hydraulic chamber 52A) to the first coupling threaded hole 34A. The first fastener 36 includes a communication hole 36A (FIG. 6). The communication hole 36A connects the first through-hole 32A and the first coupling threaded hole 34A in a state where the first fastener 36 is provided in the first through-hole 32A and the first coupling threaded hole 34A.

Second Embodiment

A bicycle disc brake caliper 210 in accordance with a second embodiment will be described below referring to FIGS. 14 and 15. The bicycle disc brake caliper 210 has the same structure as that of the bicycle disc brake caliper 10 except for the mounting surface 40. Thus, elements having substantially the same function as those in the first embodiment will be numbered the same here, and will not be described and/or illustrated again in detail here for the sake of brevity.

Figure 14:
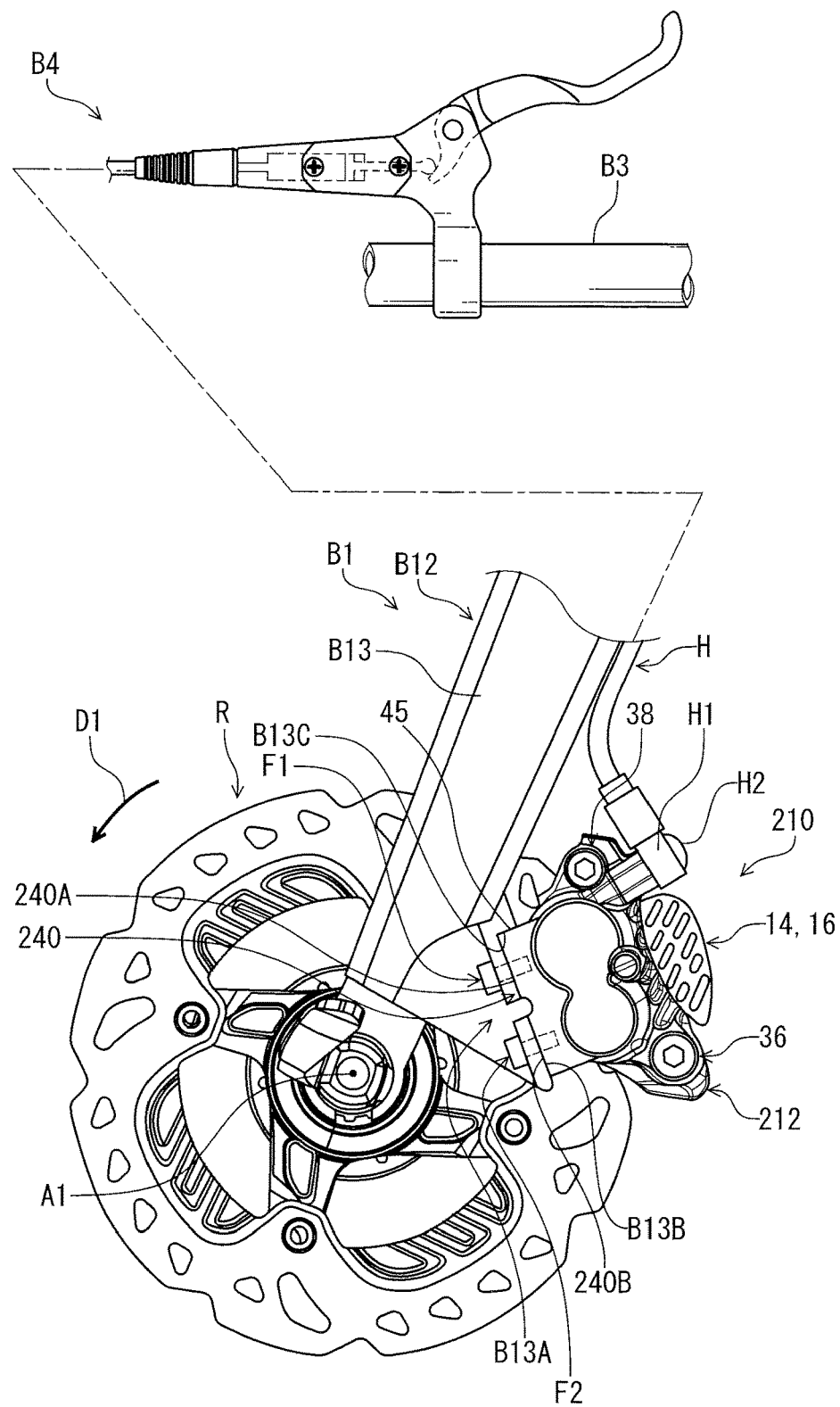
FIG. 14 is a side elevational view of a front portion of a bicycle with a bicycle disc brake caliper in accordance with a second embodiment.

As seen in FIG. 14, the bicycle disc brake caliper 210 comprises a caliper body 212. The caliper body 212 has substantially the same structure as that of the caliper body 12 of the first embodiment except for the mounting surface 40. In this embodiment, the caliper body 212 includes a mounting surface 240 configured to face the pipe portion B13 of the bicycle body B1 in a mounted state where the bicycle disc brake caliper 210 is mounted to the bicycle body B1.

Figure 15:
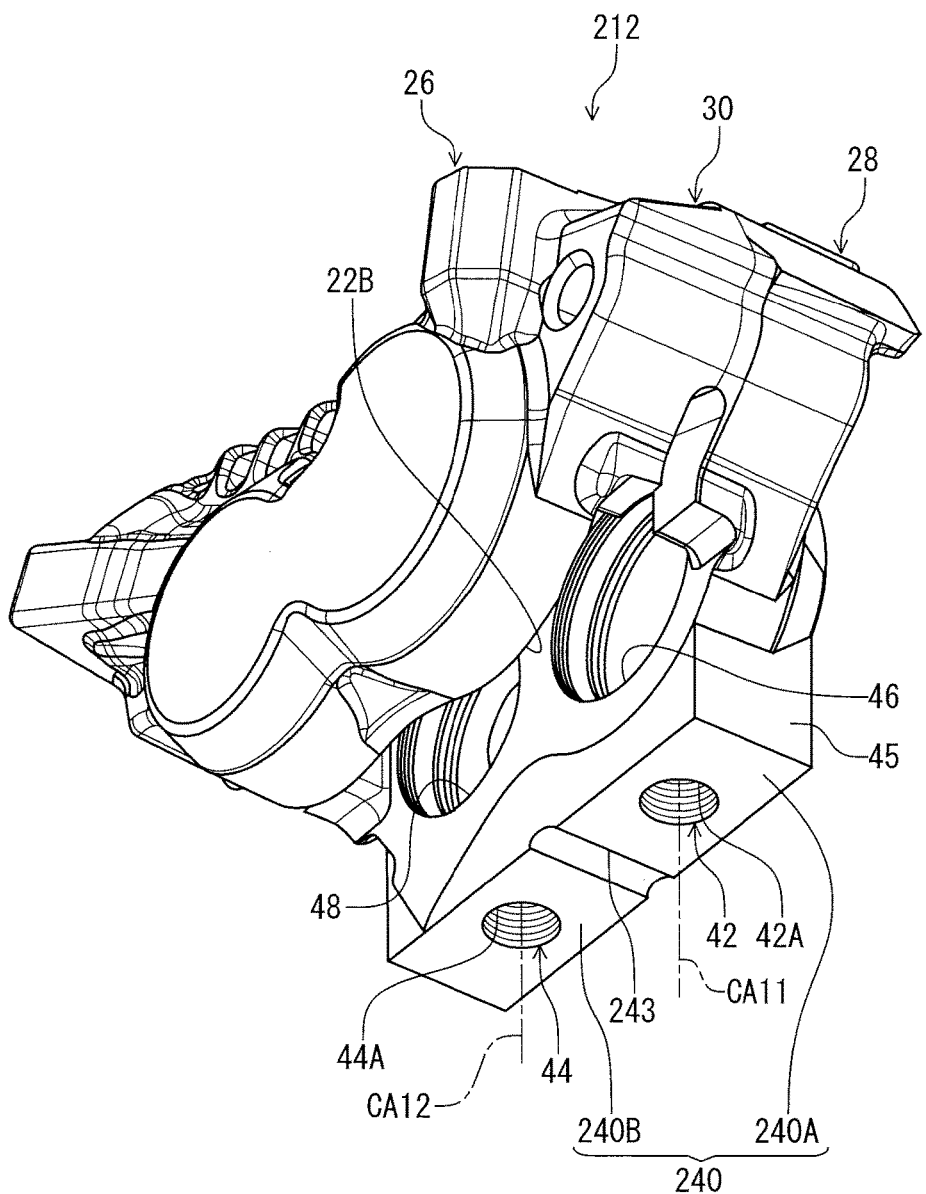
FIG. 15 is a perspective view of a caliper body of the bicycle disc brake caliper illustrated in FIG. 14.

As seen in FIGS. 14 and 15, the mounting surface 240 includes a first surface 240A and a second surface 240B spaced apart from the first surface 240A. The first receiving hole 42 is provided on the first surface 240A. The second receiving hole 44 is provided on the second surface 240B. The caliper body 212 includes a groove 243 between the first surface 240A and the second surface 240B.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle disc brake caliper comprising:
a caliper body including:
a first body portion;
a second body portion coupled to the first body portion so as to provide a slot therebetween;
a mounting surface configured to face a pipe portion of a bicycle body in a mounted state where the bicycle disc brake caliper is mounted to the bicycle body;
a first receiving hole provided on the mounting surface, the first receiving hole being configured to be threadedly engaged with a fastener to mount the bicycle disc brake caliper to the bicycle body;
a first cylinder bore provided on the first body portion; and
a second cylinder bore provided on the first body portion, wherein
the first receiving hole has a first center axis,
the first cylinder bore has a first cylinder center axis non-parallel to the first center axis, and
the first center axis extends through the first cylinder bore.

2. The bicycle disc brake caliper according to claim 1, wherein
the first cylinder center axis is perpendicular to the first center axis as viewed in a direction perpendicular to both the first center axis and the first cylinder center axis.

3. The bicycle disc brake caliper according to claim 1, wherein
the mounting surface is provided on the first body portion.

4. The bicycle disc brake caliper according to claim 3, wherein
the first cylinder center axis is offset from the first center axis.

5. The bicycle disc brake caliper according to claim 1, wherein
the caliper body further includes a second receiving hole provided on the mounting surface.

6. The bicycle disc brake caliper according to claim 5, wherein
the second receiving hole includes a second threaded hole having a second center axis, and
the second cylinder bore has a second cylinder center axis non-parallel to the second center axis.

7. The bicycle disc brake caliper according to claim 6, wherein
the second cylinder center axis is perpendicular to the second center axis as viewed in a direction perpendicular to both the second center axis and the second cylinder center axis.

8. The bicycle disc brake caliper according to claim 6, wherein
the mounting surface is provided on the first body portion, and
the second center axis extends through the second cylinder bore.

9. The bicycle disc brake caliper according to claim 8, wherein
the second cylinder center axis is offset from the second center axis.

10. The bicycle disc brake caliper according to claim 6, wherein the first receiving hole includes a first threaded hole having the first center axis, and the second center axis is parallel to the first center axis.

11. The bicycle disc brake caliper according to claim 10, wherein a distance between the first center axis and the second center axis is equal to or larger than 15 mm and is equal to or smaller than 55 mm.

12. The bicycle disc brake caliper according to claim 10, wherein no portion of the caliper body extends beyond the mounting surface in a direction toward the bicycle body along a line extending directly between the first threaded hole and the second threaded hole.

13. The bicycle disc brake caliper according to claim 1, wherein the second cylinder bore has a second cylinder center axis parallel to the first cylinder center axis.

14. The bicycle disc brake caliper according to claim 1, wherein the first cylinder bore has a first maximum inner diameter, the second cylinder bore has a second maximum inner diameter, and the first maximum inner diameter is different from the second maximum inner diameter.

15. The bicycle disc brake caliper according to claim 14, wherein the first cylinder bore is provided on a downstream side of the second cylinder bore in a driving rotational direction in which a disc brake rotor is rotated relative to the bicycle disc brake caliper in a driving state where a bicycle is forwardly moved, and the first maximum inner diameter is larger than the second maximum inner diameter.

16. The bicycle disc brake caliper according to claim 14, wherein the caliper body includes a hydraulic port, the first cylinder bore has a first maximum inner diameter, the first cylinder bore is closer to the hydraulic port than the second cylinder bore, the second cylinder bore has a second maximum inner diameter, and the first maximum inner diameter is larger than the second maximum inner diameter.

17. The bicycle disc brake caliper according to claim 1, wherein the caliper body further includes:
a third cylinder bore provided on the second body portion to face the first cylinder bore; and
a fourth cylinder bore provided on the second body portion to face the second cylinder bore.

18. The bicycle disc brake caliper according to claim 17, wherein the first cylinder bore has a first maximum inner diameter, the second cylinder bore has a second maximum inner diameter, the third cylinder bore has a third maximum inner diameter equal to the first maximum inner diameter, and the fourth cylinder bore has a fourth maximum inner diameter equal to the second maximum inner diameter.

19. The bicycle disc brake caliper according to claim 1, wherein the mounting surface includes a first surface and a second surface spaced apart from the first surface, the first receiving hole is provided on the first surface, and the second receiving hole is provided on the second surface.

20. The bicycle disc brake caliper according to claim 1, wherein the mounting surface is provided on the first body portion, and the first body portion is farther from a center longitudinal plane of the bicycle body than the second body portion in the mounted state.

21. The bicycle disc brake caliper according to claim 1, wherein the caliper body includes a hydraulic port to which a hydraulic hose is adjustably coupled.

22. A bicycle disc brake caliper comprising:

a caliper body including:
a first body portion;
a second body portion coupled to the first body portion so as to provide a slot therebetween;
a mounting surface configured to face a pipe portion of a bicycle body in a mounted state where the bicycle disc brake caliper is mounted to the bicycle body;
a first receiving hole provided on the mounting surface, the first receiving hole being configured to be threadedly engaged with a fastener to mount the bicycle disc brake caliper to the bicycle body;
a first cylinder bore provided on the first body portion; and
a second cylinder bore provided on the first body portion, wherein the caliper body further includes a second receiving hole provided on the mounting surface, the second receiving hole has a second center axis, the second cylinder bore has a second cylinder center axis non-parallel to the second center axis, and the second center axis extends through the second cylinder bore.

23. The bicycle disc brake caliper according to claim 22, wherein the second receiving hole includes a second threaded hole.

24. The bicycle disc brake caliper according to claim 23, wherein the second cylinder center axis is perpendicular to the second center axis as viewed in a direction perpendicular to both the second center axis and the second cylinder center axis.

25. The bicycle disc brake caliper according to claim 23, wherein the mounting surface is provided on the first body portion.

26. The bicycle disc brake caliper according to claim 25, wherein the second cylinder center axis is offset from the second center axis.

* * * * *